United States Patent
Le Houerou et al.

(10) Patent No.: US 9,106,369 B2
(45) Date of Patent: Aug. 11, 2015

(54) METHOD AND APPARATUS FOR CONTROLLING THE DATA RATE OF A DATA TRANSMISSION BETWEEN AN EMITTER AND A RECEIVER

(71) Applicant: CANON KABUSHIKI KAISHA, Tokyo (JP)

(72) Inventors: Brice Le Houerou, Acigne (FR); Arnaud Closset, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/027,899

(22) Filed: Sep. 16, 2013

(65) Prior Publication Data

US 2014/0079170 A1    Mar. 20, 2014

(30) Foreign Application Priority Data

Sep. 18, 2012    (GB) .................................. 1216633.6

(51) Int. Cl.
  H04B 1/38      (2006.01)
  H04L 7/00      (2006.01)
  H04L 12/825    (2013.01)
  H04L 12/841    (2013.01)
  H04L 12/835    (2013.01)

(52) U.S. Cl.
  CPC ............ *H04L 7/0016* (2013.01); *H04L 47/263* (2013.01); *H04L 47/283* (2013.01); *H04L 47/30* (2013.01)

(58) Field of Classification Search
  CPC ........ H04J 3/40; H04J 3/0638; H04L 1/0002; H04L 1/0015; H04L 43/16; H04L 25/03019; H04B 17/0042

USPC .......................... 375/222, 260; 370/232–234
See application file for complete search history.

(56) References Cited

U.S. PATENT DOCUMENTS

| | | | |
|---|---|---|---|
| 4,756,007 A * | 7/1988 | Qureshi et al. ................ 375/259 |
| 6,657,954 B1 | 12/2003 | Bird et al. | |
| 2003/0123477 A1 | 7/2003 | Gollamudi et al. | |
| 2004/0190452 A1* | 9/2004 | Imiya et al. ................... 370/232 |
| 2005/0213500 A1 | 9/2005 | Gaur | |
| 2006/0018257 A1* | 1/2006 | Seo ............................... 370/232 |
| 2012/0170469 A1* | 7/2012 | Curcio et al. ................. 370/252 |

* cited by examiner

*Primary Examiner* — Don N Vo
(74) *Attorney, Agent, or Firm* — Canon USA Inc. IP Division

(57) ABSTRACT

A method of controlling the data rate of a data transmission between an emitter and a receiver, wherein data rate adaptation control commands may be sent using a return path from the receiver to the emitter, which comprises monitoring at least one receiving condition at the receiver; determining at least one threshold on said receiving conditions to trigger data rate adaptation control commands; estimating the transmission time of the data rate adaptation control commands from the receiver to the emitter and adjusting the threshold on these receiving conditions to trigger data rate adaptation control commands based on said estimation of the transmission time from the receiver to the emitter.

Accordingly, by continuously adjusting at least one said triggering threshold according to the variation of the transmission time of said data rate adaption commands, a more efficient data rate adaptation method is obtained minimizing the adaptation needs.

15 Claims, 6 Drawing Sheets

METHOD AND APPARATUS FOR CONTROLLING THE DATA RATE OF A DATA TRANSMISSION BETWEEN AN EMITTER AND A RECEIVER

REFERENCE TO RELATED APPLICATIONS

This application claims the priority benefit under 35 U.S.C. §119(e) of GB Application No. 1216633.6 filed on Sep. 18, 2012. The text of this application is incorporated by reference in its entirety.

BACKGROUND OF THE INVENTION

The present invention concerns a method and a device for data rate adaptation between an emitter and a receiver and more particularly such a method operable for a low buffering and low latency communication system.

The context of the invention concerns high data rates, typically over gigabits per second requiring a very low latency, typically sub micro-second latency. In this context, a traditional data rate adaptation control mechanism based on monitoring the receiver input buffer is sensitive to the variation of latency of the control feedback channel. In order to maintain the data rates performances, a large receiver input buffer is required to compensate for the maximum round-trip delay of the communication. Such a large receiver input buffer introduces an additional latency equivalent to the round-trip delay. Using this method, the overall latency is double.

It is desirable to reduce the feedback channel jitter transporting data rate adaptation control in order to obtain a communication latency equivalent to the one without data rate adaptation. It is desirable to use the return path for the feedback path, in order to allow full duplex communication. It is also desirable to keep the required bandwidth as low as possible in order to allow very high data rates on the return path.

SUMMARY OF THE INVENTION

The present invention has been devised to address one or more of the foregoing concerns.

It is based on monitoring the filling level of the receiver input buffer to trigger data rate adaptation. The filling levels used to trigger the control change dynamically depending on the transmission time of control data from the receiver to the emitter.

According to a first aspect of the invention there is provided a method of controlling the data rate of a data transmission between an emitter and a receiver, wherein data rate adaptation control commands may be sent using a return path from the receiver to the emitter, the method comprising monitoring at least one receiving condition at the receiver; determining at least one threshold on said at least one receiving condition to trigger data rate adaptation control commands; estimating the transmission time of the data rate adaptation control commands from the receiver to the emitter; and adjusting at least one said threshold on at least one said receiving condition to trigger data rate adaptation control commands based on said estimation of the transmission time of the data rate adaptation control commands from the receiver to the emitter. Accordingly, by continuously adjusting at least one said triggering threshold according to the variation of the transmission time of said data rate adaption commands, a more efficient data rate adaptation method is obtained minimizing the adaptation needs.

In an embodiment the method further comprises determining at least one threshold on said at least one receiving condition to trigger data rate adaptation control commands comprises determining a set of at least one said threshold, and adjusting at least one said threshold comprises changing the set of at least one said threshold used to trigger data rate adaptation control commands. Accordingly, the continuous adjustment is easily realized.

In an embodiment the receiving condition monitored at the receiver is the filling level of the receiver input buffer.

In an embodiment determining at least one threshold on said receiving conditions to trigger data rate adaptation control commands comprises: determining a first threshold corresponding to an almost empty filling level of the receiver input buffer; and determining a second threshold corresponding to an almost full filling level of the receiver input buffer. Accordingly, the adjustment is intended to prevent buffer overflow or underflow.

In an embodiment the transmission time of the data rate adaptation control commands from the receiver to the emitter is estimated based on the filling level of the emitting buffer for said data rate control commands at the receiver. Accordingly, the waiting time and therefore the transmission time is estimated.

In an embodiment the estimation comprises: determining at least one threshold on the filling level of the emitting buffer for the data rate control commands at the receiver; and associating the ranges of filling levels defined by at least one said threshold with estimations of the transmission time. Accordingly the reaction time of the data rate adaptation is estimated.

In an embodiment said set of at least one threshold on at least one said receiving condition to trigger data rate adaptation control commands is associated with corresponding ranges of filling level of the emitting buffer for the data rate control commands at the receiver.

According to another aspect of the invention there is provided a controlling device for controlling the data rate of a data transmission between an emitter and a receiver, wherein data rate adaptation control commands may be sent using a return path from the receiver to the emitter, the controlling device comprising: a monitoring module to monitor at least one receiving condition at the receiver; a determining module to determine at least one threshold on said at least one receiving condition to trigger data rate adaptation control commands; an estimator to estimate the transmission time of the data rate adaptation control commands from the receiver to the emitter; and an adjusting module to adjust at least one said threshold on at least one said receiving condition to trigger data rate adaptation control commands based on said estimation of the transmission time of the data rate adaptation control commands from the receiver to the emitter.

In an embodiment the determining module to determine at least one said threshold on at least one said receiving condition to trigger data rate adaptation control commands comprises: a determining module to determine a set of at least one said threshold, and the adjusting module to adjust at least one said threshold comprises a changing module to change the set of at least one said threshold used to trigger data rate adaptation control commands.

In an embodiment the determining module to determine at least one threshold on said at least one receiving condition to trigger data rate adaptation control commands comprises: a determining module to determine a first threshold corresponding to an almost empty filling level of the receiver input buffer; a determining module to determine a second threshold corresponding to an almost full filling level of the receiver input buffer.

In an embodiment the estimation is performed by: a determining module to determine at least one threshold on the filling level of the emitting buffer for the data rate control commands at the receiver; and an association module to associate the ranges of filling levels defined by at least one said threshold with estimations of the transmission time.

According to another aspect of the invention there is provided a computer program product for a programmable apparatus, the computer program product comprising a sequence of instructions for implementing a method according to the invention when loaded into and executed by the programmable apparatus.

According to another aspect of the invention there is provided a computer-readable storage medium storing instructions of a computer program for implementing a method, according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE PREFERRED EMBODIMENT

Figure 1:
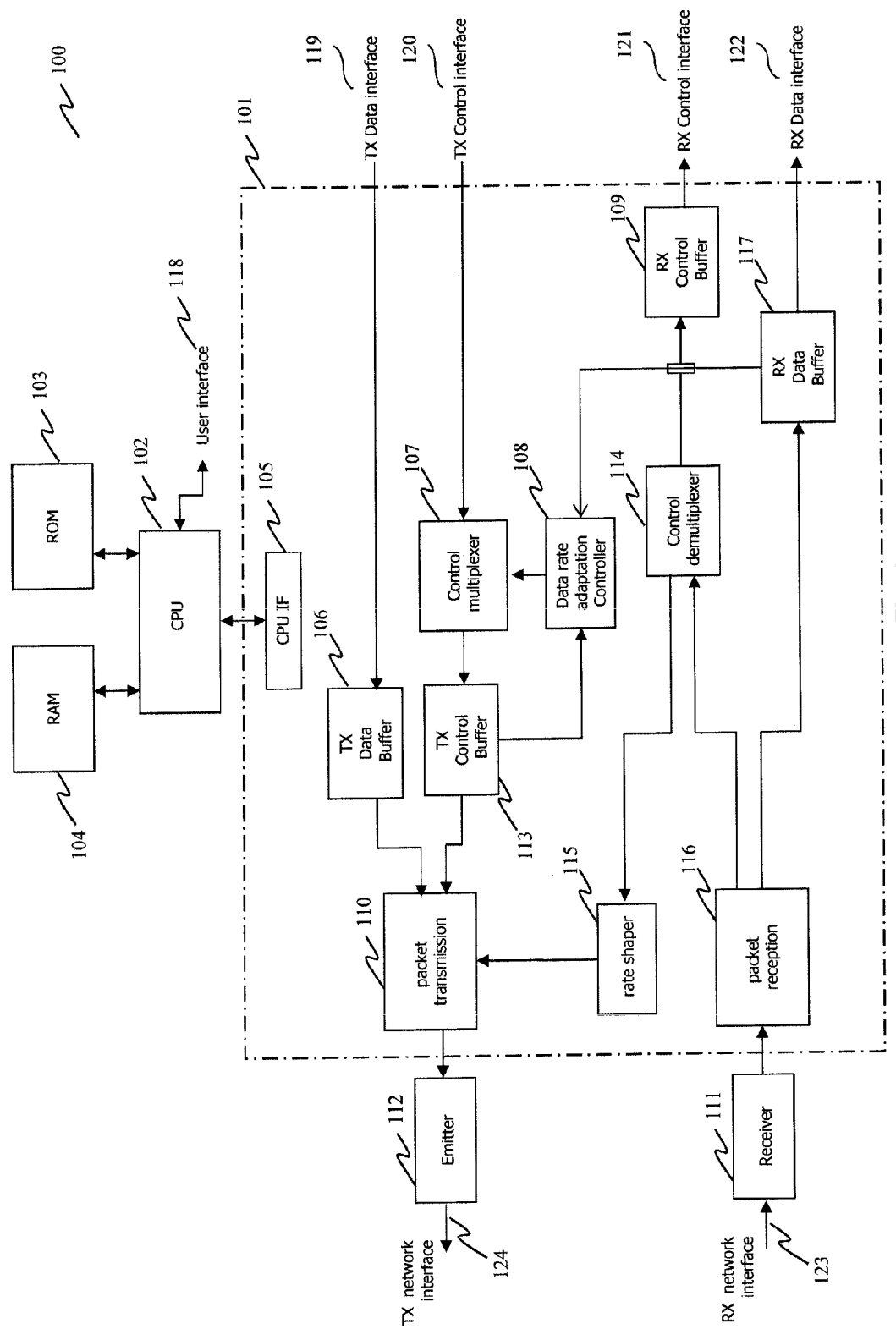
FIG. 1 illustrates the architecture of the communication device in an exemplary embodiment of the invention.

An embodiment of the invention is made in the context of a system for transmission between a first device, the emitter, and a second device, the receiver, wherein the emitter transmits a stream of data packets to the receiver at a controlled data rate. The transmission data rate out of the emitter is typically controlled by a rate shaper aiming at maintaining the transmission rate substantially constant during predetermined periods of time. The rate shaper itself is typically controllable by a rate adjustment module that allows adjustment of the transmission rate based on feedback information from the receiver to prevent situations of buffer underflow.

It is an object of the invention to provide a method of adjusting the transmission rate that is operable for a low buffering and low latency system for communication between the first and the second device. A further object of the invention is to have a method that can cope with a return path of variable transmission time.

The emitter transmits a stream of data at a given data rate to a receiver. The receiver monitors pre-determined receiving conditions relative to the actual received data rate. These receiving conditions may vary depending on embodiments. In the exemplary embodiment, the receiving condition that is monitored is the filling level of the receiver input buffer. In another embodiment, the monitored receiving condition may be the actual received data rate as measured by the physical layer. In another embodiment, the monitored receiving condition may be the packet error rate as measured by receiver using error detection based on a cyclic redundancy check (CRC).

At least one threshold is based on these monitored receiving conditions to trigger data rate adaptation. For example, when the actual measured received data rate exceeds the desired rate by a given percentage the receiver triggers a slowdown control command and sends it to the emitter.

In the exemplary embodiment based on monitoring the filling level of the receiver input buffer, a threshold is based on a low filling level. When the actual filling level reaches this threshold an accelerate control command is triggered by the receiver and sent to the emitter.

The receiver input buffer is defined as the storage means where data are stored after reception before being consumed by the user, the user being typically an application. It is typically managed by the link layer which is in charge of packet reconstruction after decoding of the physical received signal by the physical layer.

Advantageously the data rate adaptation method will continuously adjust the triggering thresholds of the data rate adaption commands to the variation of the transmission time of those data rate adaption commands.

Data rate adaptations based on monitoring the receiver input buffer level all works on the same basis. At least one threshold is set based on the filling level of the buffer. When the actual filling level crosses these thresholds, it means that a condition of buffer overflow or a condition of buffer underflow is approaching. This triggers an adaptation command to slow down or to accelerate the transmission depending on the buffer condition to avoid the overflow or the underflow.

If the thresholds are chosen in a conservative manner, meaning far from the actual underflow or overflow condition, adaptation will be triggered often leading to many adaptation commands being sent. This is bandwidth consuming. On the other hand, determining thresholds too close to the actual underflow or overflow condition leads increasing the risk of late adaptation and possibly reaching the overflow or underflow condition.

The time used by the system to take into account the need for data rate adaptation is a key factor in the efficiency of the system. This is particularly true in a system with very high data rates and low latency. This time is mainly the transmission time of the control commands from the receiver to the emitter.

According to the invention the transmission time of the data rate control commands is monitored. It may be directly measured or it may be estimated. In the exemplary embodiment, the transmission time of the data rate control commands is estimated based on the filling level of the emitting buffer for these data rate control commands at the receiver. Indeed, the waiting time before the actual transmission of the command is related to the filling level of the emitting buffer. At least one threshold based on the filling level of the emitting buffer defines a pre-determined range of filling levels which are associated with an estimation of the transmission time.

According to the monitoring of the transmission time of the data rate control commands the triggering thresholds of the data rate control are adjusted. When the transmission time is long meaning that the data rate control will be slow to react, the thresholds have to be chosen conservatively. The triggering of the data rate control should occur long before the occurrence of the trouble condition it is desired to prevent.

In contrast, when the transmission time is very short, the data rate control will be very fast to react. It is possible to wait until the last minute to trigger the control and have the triggering thresholds chosen very close to the trouble condition with no risk.

The exemplary embodiment will now be described in detail.

FIG. 1 shows the schematic structure of a communications device 100 implementing a particular embodiment of the invention. More specifically, in this exemplary embodiment, the communications device 100 is integrated into either the emitter communication device or the receiver communication device.

The communications device 100 comprises a RAM (Random Access Memory) 104 working as a main memory. It also comprises a computation block 102 denoted CPU (Central Process Unit) whose capacity can be extended by an optional random-access memory connected to an expansion port not shown in FIG. 1. The CPU 102 is capable of executing instructions from the ROM 103. After the system has been powered on, the CPU 102 is capable of executing instructions from the RAM 104 pertaining to a computer program, once these instructions have been loaded from the ROM 103 or an external memory. A computer program of this kind, if executed by the CPU 102, prompts the execution of some or all of the steps of the algorithms described below in particular those described with reference to FIGS. 3, 4, 5 and 6.

It further comprises a communication unit 101 having the task of managing the transmission to and from other communication devices. This communication unit 101 operates under control of the CPU 102. The CPU 102 receives requests to transmit data and control signals from the user interface 118. According to those requests, The CPU 102 configures the communication unit 101 in order to set up the transfer of data to be transmitted with the data rate requested by the user.

The data and control signals are exchanged between the communication unit and the user over the transmitting data interface 119, the transmitting control interface 120, the receiving control interface 121 and the receiving data interface 122. According to the CPU configuration, received over the CPU interface 105, the communication device 101 consumes the data and control to be transmitted respectively from the transmitting data interface 119 and transmitting control interface 120.

The data to be transmitted are stored in a transmitting data buffer 106 before the packet transmission 110 is performed. The control information to be transmitted received from the transmitting control interface 120 and the data rate adaptation control information, generated by the data rate adaptation controller 108, are multiplexed by the control multiplexer 107 and stored in the transmitting control buffer 113 before packet transmission 110 is performed. The built packets are transmitted by the emitter 112 over the transmitting network interface 124. The packet format used by the packet transmission is illustrated on FIG. 2.

The packet transmission 110 is controlled by the rate shaper 115 having the task of reserving for each built packet a first part of the bandwidth to transmit data and the remaining part to transmit control. The rate shaper 115 received the data rate adaptation control information from the demultiplexer 114. This demultiplexer 114 has the task of separating the data rate adaptation control information and the user control within the received control.

The data rate adaptation controller 108 generates the data rate adaptation control information according to the filling level of the receiver input buffer 117, the filling level of the transmitting control buffer 113 and the data rate requested by the user. This algorithm is described hereinafter in relation to FIG. 5.

Over the receiving network interface 123, a receiver 111 forwards any received packets to the packet reception module 116 having the task of separating the data and control information. The received control information is sent to the demultiplexer 114. The received data are sent to the receiver input buffer 117 before outgoing over the receiving control interface 121. The received user control information is stored in the receiving control buffer 109 before outgoing over the receiving control interface 122.

The device can be used either as a transmit communication device or a receive communication device. The device is able to support full duplex communication.

Figure 2:
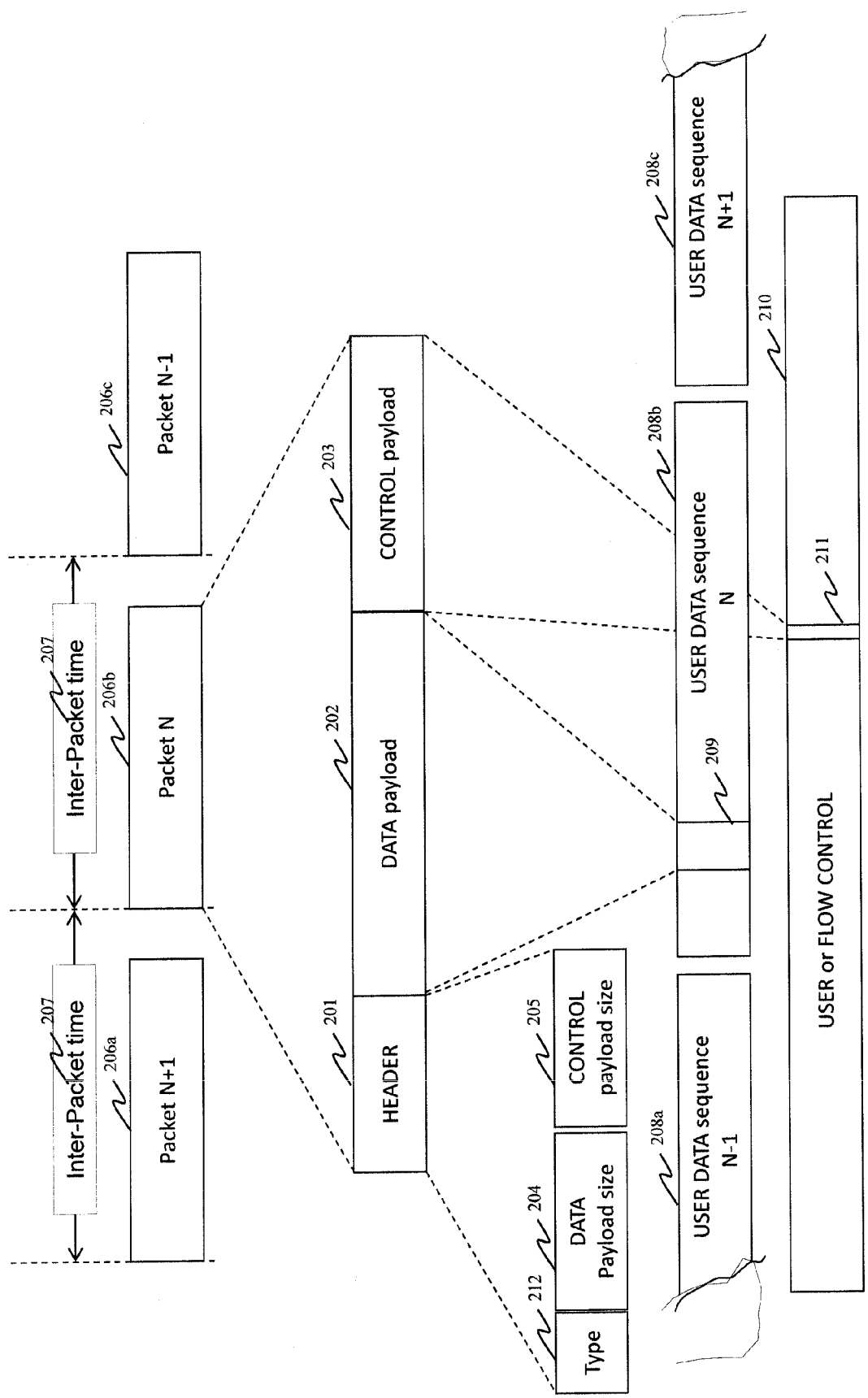
FIG. 2 illustrates the packet format in an exemplary embodiment of the invention.

FIG. 2 illustrates an overview of the packet format used in the exemplary embodiment of the invention for the transmission of data and control information.

A data stream has to be transmitted. It is composed of so called user data sequences 208a, 208b and 208c. It is exchanged with the user by data interfaces 119 and 122 shown in FIG. 1.

A control stream 210 has to be transmitted also. It is composed of control commands which may be user control commands or data rate adaptation control commands. It is exchanged with the user by data interfaces 120 and 121 shown in FIG. 1.

These two streams have to be multiplexed and transmitted over the communication channel. To achieve this goal a packet format is defined. This packet is composed of a header 201 optionally followed by a data payload 202 coming from the user data sequence segment 209 and optionally by a control payload 203 coming from the control segment 211.

The header 201 comprises a first field 212 to code the type of packets. it is used among other things to indicate if the control part of the packet is user control information or data rate adaptation control. The header also comprises a field 204 to indicate the size of the data payload 202 and a field 205 to indicate the size of the control payload 203.

The packets are transmitted over the network interfaces 111 and 112 shown in FIG. 1. For this purpose, a fixed inter-packet time interval 207 is defined as a period. Exactly one packet 206 is transmitted in each inter-packet time interval. The definition of the inter-packet time interval and the size of the data payload define the data rate of the transmission.

A required data rate is indicated in the user data stream for each user data sequence. This data rate may change from sequence to sequence.

In the exemplary embodiment, the following data rate adaptation control commands are used:

- A "Start of data sequence" message sent by the emitter to indicate the beginning of a new data sequence to the receiver;
- An "End of data sequence" message sent by the emitter to indicate the end of a new data sequence to the receiver;
- A "Faster data rate request" message sent by the receiver to indicate to the emitter that an acceleration of the data rate is required; and
- A "Slower data rate request" message sent by the receiver to indicate to the emitter that a slowdown of the data rate is required.

Figure 3:
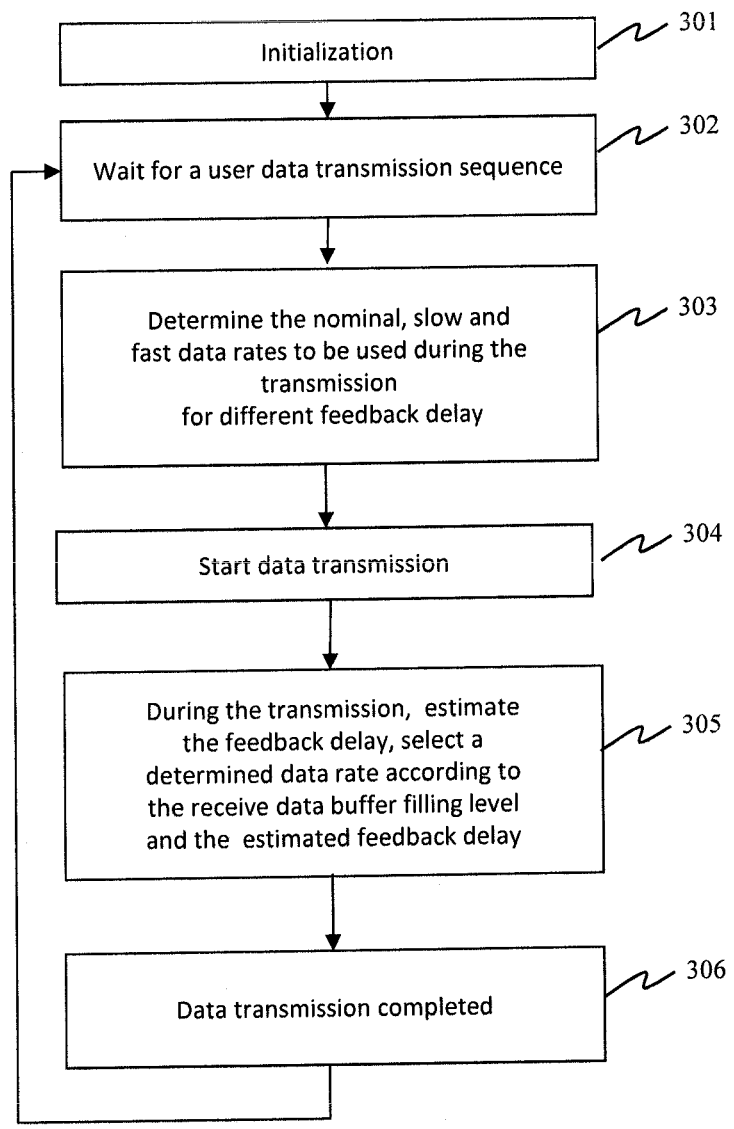
FIG. 3 illustrates the method for implementing the data rate adaptation between the emitter and the receiver in an exemplary embodiment of the invention.

FIG. 3 illustrates a principle of the invention as implemented in the exemplary embodiment.

The communication system of the exemplary embodiment is composed of at least two communication devices such as the one described in relation to FIG. 1.

A first communication device, named the transmitter, is involved in the transmission of the user data sequence. The second communication device, named the receiver, is involved in the reception of the user data sequence.

In a step 301, the communication system 100 is initialized for both the emitter and the receiver.

In a step 302, the communication system, and more particularly the emitter, waits for a request from the user asking to transmit a data sequence.

In a step 303, the communication system determines the nominal, slow and fast data rates to be used during the transmission according to different transmission times of data rate adaptation control commands from the receiver to the emitter.

Figure 4:
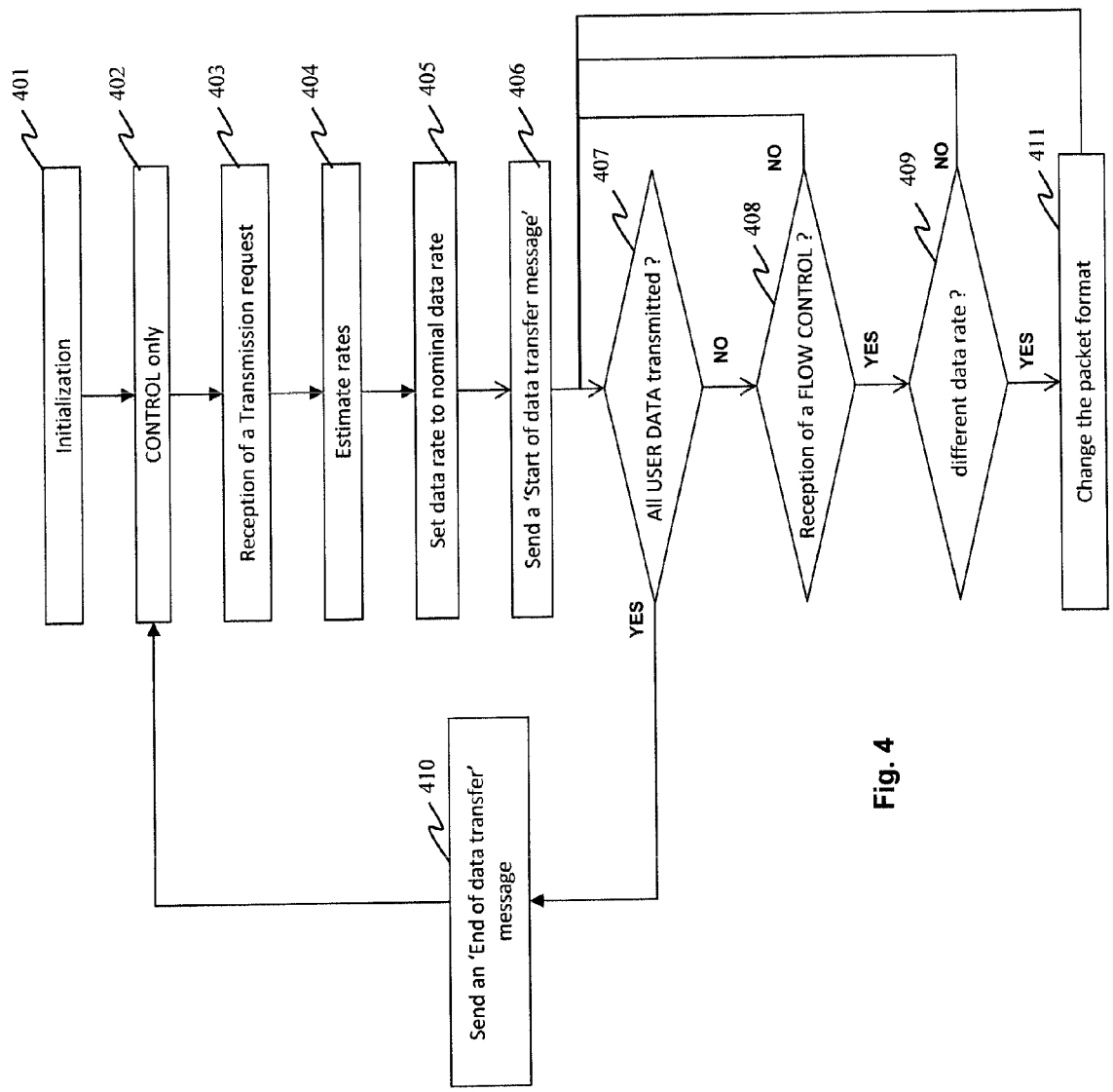
FIG. 4 illustrates the communication method implemented by the emitter in an exemplary embodiment of the invention.
Figure 5:
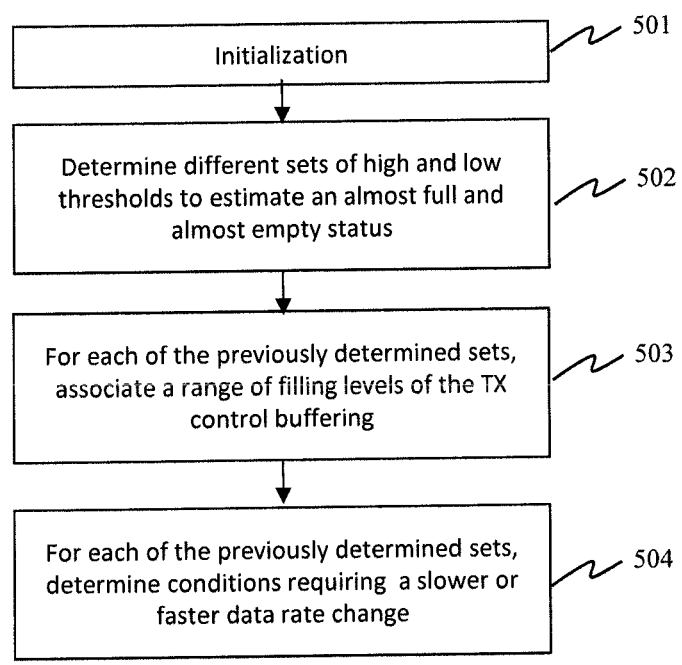
FIG. 5 illustrates a data rate adaptation configuration method implemented by the receiver in an exemplary embodiment of the invention.

In a step 304, the communication system starts a data transmission from the emitter to the receiver using the data rate adaptation control method of the invention as described in relation to FIGS. 4, 5 and 6.

In a step 305, the communication system continuously estimates the transmission time of data rate adaptation control commands from the receiver to the emitter. According to this estimation and the filling level of the receiver input buffer, the communication system selects the appropriate data rate from the data rates determined in the step 303.

The selection is repeated until the end of the data sequence is reached, so performing a continuous adaptation of the data rate based on the monitored receiving condition constituted by the filling level of the receiver input buffer and the transmission time of data rate adaptation control commands.

In a step 306, the data sequence transmission is completed by the communication system which returns to step 302.

FIG. 4 illustrates the method used by the emitter to actually transmit data according to the exemplary embodiment of the invention. This method allows the emitter to configure itself for a given data rate when receiving a request to transmit data. Afterwards, during the actual transmission, this data rate is adjusted according to the received data rate adaptation commands.

After a first step 401 of initialization begins the configuration which is represented by steps 402 to 405.

The emitter configures itself for control transmission only in the step 402. This control may concern user control or data rate adaptation control commands. The packets are then constituted by only a header and a control payload, the data payload is omitted, the data payload size is set to zero.

Next the emitter waits, step 403, for a data transmission request coming from the user interface. When this request is received, the nominal data rate is determined. It may be predefined or indicated by the user for example within the request. Once this nominal data rate is determined in the step 404, the emitter configures itself for using that data rate. This is the step 405. In the exemplary embodiment, this is done by configuring the inter-packet time and the data payload size accordingly.

Advantageously an accelerated data rate and a slow data rate are determined during step 404. These rates will be used in response to data rate adaptation control commands to speed up or slow down the transmission. Typically they correspond to a greater and smaller data payload size, leaving the inter-packet time unchanged. The person skilled in the art understands that the inter-packet time may be changed also.

For example, for a required data rate of 3 Gigabits per second, a possible inter-packet time is 250 ns with a data payload size equal to 750 bits. The accelerated data rate may be defined 1% greater at 3.03 Gigabits per second, corresponding to a data payload size of 758 bits. The slow data rate may be defined 1% lower at 2.97 corresponding to a data payload size of 742 bits.

Next the actual data transmission may be started. Typically, it begins with the emitter transmitting a "Start of data transfer" control message to the receiver in a step 406.

The actual transmission of the data using the nominal data rate is initiated. On a regular basis, the emitter tests if all the user data have been transmitted in a step 407. When this is the case, it sends an "End of data transfer" message to close the transmission in a step 410 and return to the step 402.

On the reception of a data rate adaptation command in the step 408, the emitter tests if a different data rate is requested by the receiver in the step 409. If this is the case, it takes the request into account, typically by changing the data payload size of the packets to fulfill the request in the step 411.

FIG. 5 illustrates the method used in the exemplary embodiment to determine the thresholds for the triggering of the data rate adaptation control depending on the transmission time of the data rate adaptation control commands. This method may be implemented by the receiver or by any device controlling the receiver.

The exemplary embodiment using the filling level of the reception buffer as the receiving condition to be monitored, the data rate adaptation control is triggered by a threshold on this filling level.

After an initialization step 501, in step 502, different sets of high and low thresholds are determined to estimate an almost full and almost empty receiver input buffer. These sets are determined depending on the data rate adaptation control command transmission time. The lower this transmission time is, the closer the thresholds are from the actual limit condition. For example, a first set is defined with a low threshold set to 10% of the receiver input buffer size and a high threshold set to 90% of the receiver input buffer size. This set will be used when the transmission time of control command is short meaning that the system is reacting quickly when the filling level of the receiver input buffer is approaching the limit conditions.

A second set is defined with a low threshold for example set to 30% of the receiver input buffer size and a high threshold for example set to 70% of this receiver input buffer size. This set will be used when the transmission time of control command is longer meaning that the system is reacting slower when the filling level of the receiver input buffer is approaching the limit conditions.

In step 503, the thresholds associated with the estimation of the control command transmission time are fixed. In the exemplary embodiment, this estimation is made by measuring the filling level of the receiver control command output buffer. This buffer is where the data adaptation control commands are stored before their actual transmission. A threshold of 50% is determined. When the filling level of the receiver control command output buffer is under this threshold the transmission time is estimated as being fast and the first set of thresholds, 10% and 90%, is used. When the filling level of the receiver control command output buffer is above this threshold the transmission time is estimated as being slow and the first set of thresholds, 30% and 70%, is used.

Therefore, by monitoring the receiver control command output buffer filling level, the triggering thresholds used to trigger data rate adaptation control may be adjusted according to the control command transmission time from the receiver to the emitter. This allows fine adjustment of the triggering thresholds in order to minimize the adaptation needs.

In a step 504, for each different set of thresholds, the conditions to require a change in the data rate are determined. For example, for each different set, if the receiver input buffer filling level is greater than the high threshold of the set, an almost full condition is estimated, and a slower data rate is required. Or if the receiver input buffer filling level is lower than the low threshold of the set, an almost empty condition is estimated, and a faster data rate is required.

Figure 6B:
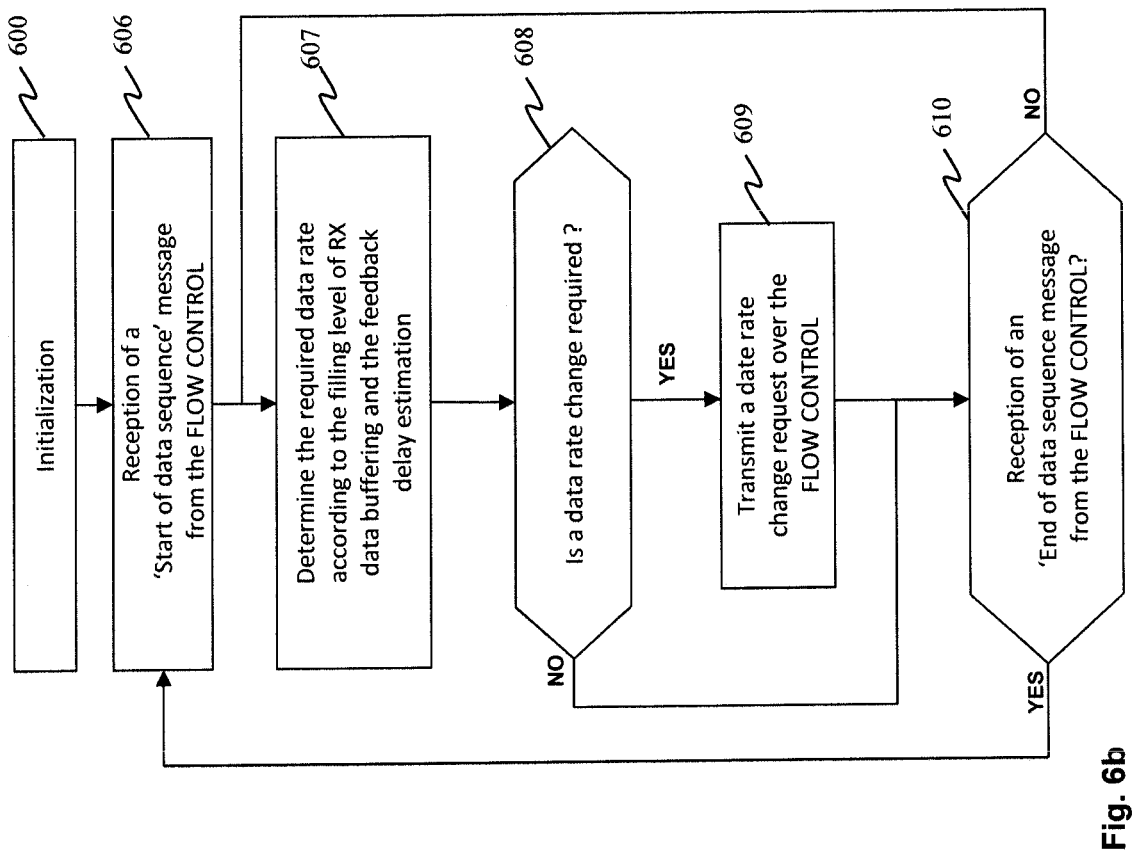
FIG. 6b illustrates the method for actually adapting the data rate by the receiver in an exemplary embodiment of the invention.
Figure 6A:
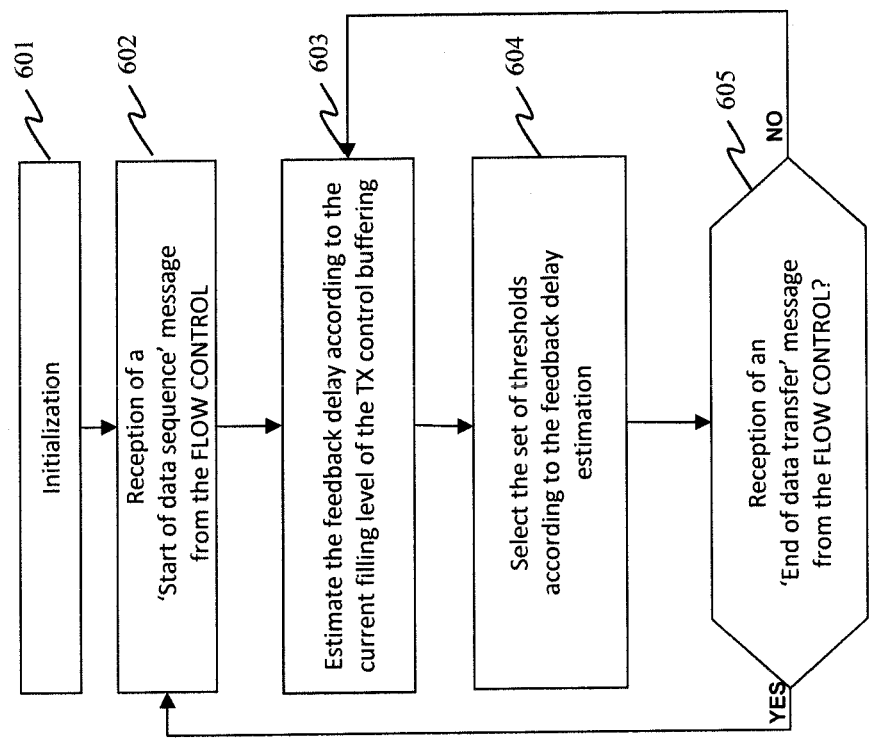
FIG. 6a illustrates the method for adapting the filling levels of the receiver input buffer that trigger the data rate adaptation in an exemplary embodiment of the invention.

FIG. 6 comprising FIGS. 6*a* and 6*b* illustrates the methods used in the receiver to actually achieve the data rate adaptation control as implemented in the exemplary embodiment. FIG. 6*a* illustrates the adaptation of the data rate adaptation control triggering thresholds according to the estimate of the transmission time of the data rate adaptation control commands.

After a step of initialization 601, the receiver waits for the reception of a "Start of data sequence" message meaning the beginning of a transmission sequence. This is done in step 602.

In step 603, the receiver monitors the filling level of the receiver control command output buffer in order to estimate the transmission time of the control command from the receiver to the transmitter. This level is checked against the determined threshold.

In step 604, the set of thresholds to be used to trigger the data rate adaptation is determined according to the result of the preceding check. If the filling level of the receiver control command output buffer is under the threshold, meaning that a fast transmission of the control is estimated, the set of thresholds close to the limit condition is chosen. Otherwise, the most conservative one is chosen.

In step 605, the reception of the "End of data transfer" message is checked. While this message is not received, the adaptation continues by returning to step 603. When this message is received, the transmission is over. The receiver waits for a new transmission by returning to step 602.

FIG. 6*b* illustrates the data rate adaptation triggering method by the receiver.

After a step of initialization 600, the receiver waits for the reception of a "Start of data sequence" message meaning the beginning of a transmission sequence. This is done in step 606. The receiver input buffer status is set to 'normal'.

In the step 607, the receiver input buffer status is determined based on the filling level of the receiver input buffer using the current set of thresholds. By using the current set of thresholds determined by the method illustrated on FIG. 6*a*, the receiver input buffer status is also based on the estimation of the transmission time of control commands from the receiver to the emitter.

If the receiver input buffer status is different from the previous one a data rate adaptation control command is triggered.

If the previous status was 'normal' and the current one is 'almost full', a command to require a slower data rate is generated.

If the previous status was 'normal' and the current one is 'almost empty', a command to require a faster data rate is generated.

If the previous status was 'almost full' or 'almost empty' and the current one is 'normal', a command to require the nominal data rate is generated.

Other transitions should not happen.

In step 609, the generated data rate adaptation control command is sent over the return data path from the receiver to the emitter.

In step 610, the reception of the "End of data transfer" message is checked. While this message is not received, the adaptation continues by returning to step 607. When this message is received, the transmission is over. The receiver waits for a new transmission by returning to step 606.

Any step of the algorithm shown in FIGS. 3 to 6 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications which lie within the scope of the present invention will be apparent to a person skilled in the art.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of controlling data rate of a data transmission between an emitter and a receiver, the method performed by a controlling device and comprising:

monitoring at least one receiving condition at the receiver;

determining at least one threshold on the at least one receiving condition to trigger data rate adaptation control commands;

estimating the transmission time of the data rate adaptation control commands from the receiver to the emitter; and adjusting the at least one threshold on the at least one receiving condition to trigger data rate adaptation control commands based on the estimated transmission time of the data rate adaptation control commands from the receiver to the emitter.

2. The method according to claim 1 wherein determining at least one threshold on the at least one receiving condition to trigger data rate adaptation control commands comprises determining a set of at least one threshold, and wherein adjusting the at least one threshold comprises changing the set of the at least one threshold used to trigger data rate adaptation control commands.

3. The method according to claim 2, wherein the set of at least one threshold on the at least one receiving condition to trigger data rate adaptation control commands is associated with corresponding ranges of filling level of an emitting buffer for the data rate control commands at the receiver.

4. The method according to claim 1 wherein the receiving condition monitored at the receiver is a filling level of the receiver input buffer.

5. The method according to claim 1 wherein determining at least one threshold on the at least one receiving condition to trigger data rate adaptation control commands comprises:
   determining a first threshold corresponding to an almost empty filling level of the receiver input buffer; and
   determining a second threshold corresponding to an almost full filling level of the receiver input buffer.

6. The method according to claim 1 wherein the transmission time of the data rate adaptation control commands from the receiver to the emitter is estimated based on a filling level of an emitting buffer for the data rate control commands at the receiver.

7. The method according to claim 6, wherein the estimation comprises:
   determining at least one threshold on the filling level of the emitting buffer for the data rate control commands at the receiver; and
   associating ranges of filling levels defined by the at least one threshold with estimations of the transmission time.

8. A non-transitory computer-readable storage medium on which is stored codes of an executable program causing a computer to execute each of the steps of the method according to claim 1.

9. A controlling device for controlling the data rate of a data transmission between an emitter and a receiver, the controlling device comprising:
   a monitoring module to monitor at least one receiving condition at the receiver;
   a determining module to determine at least one threshold on the at least one receiving condition to trigger data rate adaptation control commands;
   an estimator to estimate the transmission time of the data rate adaptation control commands from the receiver to the emitter;
   an adjusting module to adjust the at least one threshold on the at least one receiving condition to trigger data rate adaptation control commands based on the estimated transmission time of the data rate adaptation control commands from the receiver to the emitter.

10. The device according to claim 9 wherein the determining module to determine the at least one threshold on the at least one receiving condition to trigger data rate adaptation control commands comprises:
    a determining module to determine a set of at least one threshold, and
    wherein the adjusting module to adjust the at least one threshold comprises a changing module to change the set of the at least one threshold used to trigger data rate adaptation control commands.

11. The device according to claim 9 wherein the receiving condition monitored at the receiver is a filling level of the receiver input buffer.

12. The device according to claim 9 wherein the determining module to determine at least one threshold on the at least one receiving condition to trigger data rate adaptation control commands comprises:
    a determining module to determine a first threshold corresponding to an almost empty filling level of the receiver input buffer;
    a determining module to determine a second threshold corresponding to an almost full filling level of the receiver input buffer.

13. The device according to claim 9 wherein the transmission time of the data rate adaptation control commands from the receiver to the emitter is estimated based on a filling level of an emitting buffer for the data rate control commands at the receiver.

14. The device according to claim 13, wherein the estimation is performed by:
    a determining module to determine at least one threshold on the filling level of the emitting buffer for the data rate control commands at the receiver;
    an association module to associate the ranges of filling levels defined by the at least one threshold with estimations of the transmission time.

15. The device according to claim 10, wherein the set of at least one threshold on the at least one receiving condition to trigger data rate adaptation control commands is associated with corresponding ranges of filling level of an emitting buffer for the data rate control commands at the receiver.

* * * * *